United States Patent [19]

Harmetz et al.

[11] Patent Number: 4,956,429

[45] Date of Patent: Sep. 11, 1990

[54] METHOD OF MAKING A COCA LEAF FLAVOR EXTRACT

[75] Inventors: Ronald Harmetz, Randolph; Louis A. Laurenzo, Rutherford; David V. Petrocine, Saddle River, all of N.J.

[73] Assignee: Penick Corporation, Newark, N.J.

[21] Appl. No.: 317,608

[22] Filed: Mar. 1, 1989

[51] Int. Cl.⁵ .............................................. A23L 2/38
[52] U.S. Cl. .................................. 426/271; 426/429; 426/590; 426/655
[58] Field of Search ............. 426/590, 271, 655, 597, 426/425, 429, 330, 593, 650; 210/660, 663, 669; 424/195.1

[56] References Cited

U.S. PATENT DOCUMENTS

| | | | |
|---|---|---|---|
| 339,262 | 4/1886 | Brownen | 426/593 |
| 1,218,536 | 3/1917 | Eldred | 426/429 |
| 1,235,450 | 7/1917 | Eldred | 426/429 |
| 3,108,876 | 10/1963 | Turken et al. | |
| 4,031,251 | 6/1977 | Margolis et al. | |
| 4,260,517 | 4/1981 | Woodford | 427/2 |
| 4,331,694 | 5/1982 | Izod | |
| 4,364,964 | 12/1982 | van der Stegen | |
| 4,390,698 | 6/1983 | Chiovini et al. | |
| 4,407,834 | 10/1983 | Chiovini et al. | |
| 4,696,819 | 9/1987 | Bedford | 424/195.1 |
| 4,755,391 | 7/1988 | Bigalli et al. | |

FOREIGN PATENT DOCUMENTS 1865 of 1876 United Kingdom ................ 426/590
  83 of 1885 United Kingdom ................ 426/590

OTHER PUBLICATIONS

CA78(16):101929a (1984).
CA82(9):54119g (1973).
CA67(5):22056h.
CA69(14):54267k.
CA78(16):101929a (1972).
CA72(2):6256w (1969).

Primary Examiner—Carolyn Paden
Attorney, Agent, or Firm—Lerner, David, Littenberg, Krumholz & Mentlik

[57] ABSTRACT

A flavor extract is prepared by extraction of coca leaves to form a raw extract and treatment of the raw extract with an ion exchange resin to remove cocaine and ecgonine. The resulting flavor extract has excellent organoleptic properties.

23 Claims, No Drawings

METHOD OF MAKING A COCA LEAF FLAVOR EXTRACT

BACKGROUND OF THE INVENTION

The present invention relates to flavor extracts, methods of preparing the same and products incorporating the same.

The leaves of coca plants contain particularly desirable flavor constituents which can be added to edible products such as colas and other beverages, foods and pharmaceutical preparations for oral administration. However, coca leaves also contain cocaine and ecgonine alkaloids which are potent addictive drugs. In order to produce a satisfactory flavor extract for use as an additive to foods and beverages and for use as a non-drug flavor additive in pharmaceuticals, the flavor constituents in the coca leaves must be extracted from the leaves and separated from these alkaloids. This is a formidable task. Whatever process is used should separate essentially all of the cocaine and ecgonine from the flavor constituents. Presence of these substances in a flavor extract is highly undesirable for reasons of health, and is prohibited by government regulations. The flavor constituents in the coca leaves include a complex mixture of numerous components susceptible to degradation or loss during processing. The separation of the cocaine and ecgonine from the flavors should be accomplished without substantial loss or degradation of useful flavor constituents. Moreover, many of the flavor constituents are soluble in the same solvents as the undesirable alkaloids. Attempts to prepare a satisfactory flavor extract from coca leaves by first treating the leaves with various organic solvents to remove the alkaloids and then extracting the flavors from the leaves have been unsuccessful because a substantial portion of the flavors are lost with the alkaloids in the solvent extract.

Thus, prior to the present invention there have been significant unmet needs for improved methods of preparing flavor extracts from coca leaves, for improved flavor extracts made from coca leaves and for improved edible products containing such extracts.

SUMMARY OF THE INVENTION

The present invention addresses these needs.

One aspect of the present invention provides methods of making flavor extracts. A method according to this aspect of the present invention desirably includes the steps of forming a raw extract of coca leaves including flavor constituents from the leaves together with alkaloids selected from the group consisting of cocaine, ecgonine and combinations thereof in a solvent. The method further includes the steps of contacting the raw extract with a cation exchange resin so that the exchange resin takes up these alkaloids from the raw extract and separating the resulting flavor extract from the resin.

This aspect of the present invention incorporates the discovery that treatment of a coca leaf extract with cation exchange resins can separate the cocaine and ecgonine from the extract without substantially adversely affecting the flavors in the extract. Preferred processes according to this aspect of the present invention thus provide facile and effective ways of making flavor extracts having desirable taste and aroma. Preferred processes according to this aspect of the invention yield flavor extracts having no cocaine or ecgonine detectable by recognized tests for these substances, such as the Bohm's test described below. Moreover, the preferred processes can be performed economically and provide reliable separation of the cocaine and ecgonine from the extracts.

Further aspects of the present invention include improved flavor extracts prepared by the aforementioned processes, improved edible products incorporating such extracts and improved methods of making edible products.

These and other objects, features and advantages of the present invention will be more readily understood from the detailed description of the preferred embodiments set forth below.

DETAILED DESCRIPTION OF THE PREFERRED EMBODIMENTS

A process according to one embodiment of the present invention utilizes coca leaves as a starting material. As used in this disclosure, the term "cocao" should be understood broadly as including plants of all species within the genus erythroxylon and erythroxylaceae. Preferably, the leaves used are leaves of erythroxylon coca, the plant commonly referred to as the "coca plant". Also, the coca leaves utilized may be mixed with other non-leafy portions of the plant such as stems, branches and the like. The leaves may be substantially as taken from the plant without prior treatment or else may be pre-treated by drying, fermentation, roasting or the like. The leaves desirably are ground or otherwise comminuted. The size range of the comminuted leaves is selected to facilitate extraction. Desirably, the leaves are comminuted to less than about 4 mesh, and more preferably, about 9-10 mesh U.S. Standard Sieve Size.

The comminuted leaves are contacted with an extraction solvent so as to transfer flavors and the cocaine and ecgonine alkaloids from the comminuted leaves to the solvent, thereby forming a raw extract. As used in this disclosure, the terms "flavors" and "flavor constituents" should be understood as encompassing substances which are detectable by either or both of the human senses of smell and taste, i.e., as including substances which affect the aroma or taste of a product. The solvent desirably is selected from the group consisting of water, lower alcohols and combinations thereof. Solutions of water and ethanol are especially preferred. Desirably, the solvent contains between about 10% and about 90% ethanol, more desirably between about 20% and about 50% ethanol and most desirably about 20% ethanol by volume, the remainder being water. The water employed preferably is deionized or distilled water substantially free of ionic impurities. Desirably, the pH of the raw extract formed in this contacting step is less than 8, preferably between about 5 and about 7 and most preferably about 5.5 to about 7.0. If necessary, the solvent and hence the resulting extract, may incorporate physiologically acceptable acids or bases. However, these are normally unnecessary where the more preferred ethanol/water solvents are employed inasmuch as the extract formed with these solvents typically has pH within the desired range.

The leaves and solvent may be contacted in a discontinuous or batch process wherein the leaves are immersed in the solvent in an appropriate vessel and held for a predetermined contacting interval, desirably between about two hours and about forty-eight hours, more desirably between about four hours and about twenty-four hours and most desirably about fifteen hours. The contacting step may be performed at any temperature within the range from the freezing point of the solvent to its boiling point. Preferably, however, the contacting step is performed at about 15° to about 50° C. and most preferably at about 20° C. Following the contacting step, the comminuted leaves are mechanically separated from the raw extract by conventional methods such as filtration, centrifugation and the like. The step of contacting the leaves and solvent can be performed by percolation. Also, in place of separate batchwise contacting and separation steps, the contacting and separation steps can be performed in conventional continuous process equipment with cocurrent or countercurrent flow of leaves and solvent. Desirably, the ratio of leaves to solvent employed in this contacting operation is between about 0.045 and about 0.27 w/v, i.e., about 0.045 to about 0.27 grams of leaves per mililiter of solvent. Preferably, the leaf:solvent ratio is about 0.133 w/v. Most preferably, the raw extract contains about 1% to about 5% solids by weight, and most preferably about 2% to about 3.5% solids by weight.

After recovery of the raw extract, the same is contacted with a suitable cation exchange resin, desirably a sulfonic acid, carboxylic acid or phosphoric acid cation exchange resin and more desirably a sulfonic acid cation exchange resin. Particularly preferred sulfonic acid cation exchange resins incorporate the sulfonic acid moieties on a styrene structure crosslinked with divinylbenzene. Especially preferred cation exchange resins are sold under the registered trademarks AMBERLIGHT and DUOLITE by the Rohm and Haas Company of Philadelphia, Pa. Particularly preferred resins are those designated as AMBERLITE® IR-120, IR-132 and DUOLITE® C-225. The cation exchange resin prior to contact with the raw extract most preferably has exchangable H+ ions although resins having other exchangable cations such as sodium can be employed.

The contacting and step desirably is performed by maintaining the resin in an elongated column or bed having an upstream end and a downstream end and passing raw extract into the column at the upstream end. The resulting flavor extract is recovered and separated from the resin at the downstream end of the column. In this procedure, the steps of contacting the raw extract with the resin and separating the resulting flavor extract are performed on a substantially continuous or semicontinuous flow through basis. The column may be mounted vertically or horizontally. With a vertically-extensive column, the upstream end may be either the top end or the bottom end of the column. Although passage through a column represents the preferred manner of contacting the raw extract with the ion exchange resin, other contacting techniques such as a batchwise process may be employed.

The step of contacting the extract with the resin can be performed at any temperature between the freezing and boiling points of the extract. Desirably, however, this contacting step is performed at temperatures between about 15° C. and about 50° C. and most preferably at about 20° C. Preferably, the pH of the extract during the contacting step is within the aforementioned preferred pH ranges, i.e., less than 8, preferably about 5 to about 7 and most preferably about 5.5 to about 7.0. Ordinarily, no special pH adjustment or control measures are required to maintain the pH of the extract within this desired range. However, acid and/or alkali addition may be employed during the resin contacting step as required to maintain the pH within the desired range.

The ratio of extract to resin employed in the contacting step, and the conditions controlling the duration of contact between extract and resin, such as resin column depth and diameter, extract flow rate and the like should be selected to permit substantially complete transfer of the cocaine and ecgonine alkaloids from the extract to the resin. Ordinarily, a given bed of ion exchange resin will become progressively more susceptible to breakthrough or appearance of the alkaloids in the effluent as the bed is used and some alkaloids have accumulated in the more upstream portions of the bed. The conditions needed to prevent breakthrough of the undesired alkaloids with any given bed will depend upon the depth or upstream to downstream extent of the bed, the concentration of the undesired alkaloids in the incoming extract supplied at the upstream end, the extract flow rate and the like. Desirably, the ion exchange resin bed is at least about twenty-four inches deep and has a ratio of depth or upstream to downstream extent to diameter or greatest dimension crosswise to the upstream to downstream extent of about 25 to 1 or more. With the preferred ion exchange resin beds, the ratio of extract processed through the bed to the volume of resin in the bed may be about 5 to 1 or more. That is, about 5 ml of extract may be processed through the bed for each ml of resin in the bed without breakthrough of the undesired alkaloids to the effluent extract. The used resin retains the cocaine and ecgonine recovered from the raw extract. The fully used bed may be regenerated by conventional techniques such as exposing the bed to a stream of flowing dilute hydrochloric or sulfuric acid under room temperature or higher temperatures so as to dislodge the cocaine and ecgonine and also degrade these substances.

After treatment in the resin bed, the resulting flavor extract desirably contains no cocaine detectable by the Bohm's test, a standard wet chemical test for detection of cocaine and ecgonine. Bohm's test employs a reagent known as Mayer's reagent. Mayer's reagent is made by dissolving 0.68 grams of mercury chloride and 2.5 grams of potassium iodide in water sufficient to make 100 ml of the reagent solution. In the Bohm's test as referred to in this disclosure, 2 to 4 drops of Mayer's reagent and 2 to 3 drops of concentrated sulfuric acid are added to 2-5 ml of a liquid extract or solution to be tested. If the solution turns cloudy, cocaine, ecgonine or both are present.

The flavor extract prepared as above can be further treated by conventional techniques for removing solvents from flavor extracts so as to yield a more concentrated extract. As is well known, these techniques include reverse osmosis, low temperature vacuum drying, freeze drying and the like, all of which tend to preserve volatile and/or unstable flavor and aroma ingredients. These processes can be continued to yield a flavor extract essentially free of solvent. Moreover, the flavor extract, either before or after solvent removal, can be combined with additional ingredients to yield a beverage concentrate and/or beverage extract. Desirably, a preservative such as sodium benzoate is added to the extract if the extract is to be stored for a prolonged period.

EXAMPLE I 1500 grams of coca leaves from erythroxylon coca, taken from plants grown in several different areas, are mixed and ground to 9-10 mesh. The ground leaves are placed in a vessel and 11.25 liters of a solvent mixture consisting of 20% ethanol and 80% deionized water by volume are placed in the vessel along with the leaves, so that the solvent mixture entirely covers the ground leaves. The leaves are left to steep in the solvent mixture at room temperature, about 20° C., for about fifteen hours. Separation of the liquid from the leaves by filtration yields eight liters of a raw extract containing 2.5% solids and having a pH of 5.72. The raw extract is passed through a column of DUOLITE ® C-225 resin obtained from the Rohm and Haas Company of Philadelphia, Pa. The column of resin is approximately 5 cm in diameter and 1.6 meters long. The raw extract is passed through the column by gravity drainage at a rate of about 50-70 ml/min. Seven liters of flavor extract are collected at the downstream end of the column. High performance liquid chromatography and gas liquid chromatography assays confirm that the flavor extract contains no cocaine or ecgonine detectable by these methods. The flavor extract contains 2.2% solids and has a pH of about 6.10.

The flavor extract is subsequently blended with a conventional cola base, containing carbonated water, sweetener and carmel color. The resulting beverage has a pleasant, cola flavor note and aroma.

EXAMPLE II

The procedure of Example I is repeated. After the first steeping and filtration cycle, the ground leaves recovered by filtration are again extracted with a fresh batch of the same 20% ethanol/80% water solvent mixture, again with steeping for about fifteen hours at room temperature. Filtration yields a further charge of raw extract having a solids content of about 1.0%. This raw extract is passed through the same ionic column as the first raw extract from the first solvent contact step, so as to provide an additional volume of flavor extract.

EXAMPLE III

The procedure according to Example I is repeated several times, but using smaller batch sizes. In each case, 100 grams of ground coca leaves are steeped for about fifteen hours in 750 ml of a solvent mixture as specified in TABLE I below, the results are as indicated in the table. Each line in TABLE I designated by a letter represents a single sample, and includes data for that sample both before and after ion exchange treatment. In every case, the raw extract includes either cocaine or ecgonine as determined by the Bohm's test, whereas the flavor extract after ion exchange treatment has no detectable cocaine or ecgonine, based on the Bohm's test.

TABLE I

| SAMPLE | SOLVENT | RAW EXTRACT pH | RAW EXTRACT SOLIDS % | RAW EXTRACT AROMA | RAW EXTRACT FLAVOR (IN COLA BASE) | FLAVOR EXTRACT AFTER ION EXCHANGE TREATMENT AROMA | FLAVOR EXTRACT AFTER ION EXCHANGE TREATMENT FLAVOR (IN COLA BASE) |
|---|---|---|---|---|---|---|---|
| A | 50% ethanol 50% $H_2O$ | 6.65 | 3.0 | Good Cola | Good Cola | Good Cola | Good Cola |
| B | Same as A + 1% phosphoric acid | 4.0 | 4.3 | Fair to Poor | Not tested | Acceptable | Acceptable |
| C | Same as A + 1% soda ash | 9.30 | 3.3 | Poor | Not tested | Fair to Poor | Not tested |
| D | 20% ethanol 80% water | 6.80 | 2.4 | Good Cola | Good Cola | Very Good Cola | Very Good Cola (Most preferred) |
| E | Same as D + 1% phosphoric acid | 3.90 | 3.6 | Fair to Poor | Not tested | Fair to Poor | Not tested |
| F | Same as D + 1% soda ash | 9.10 | 3.1 | Fair to Poor | Not tested | Fair to Poor | Not tested |
| G | $H_2O$ + 1% phosphoric acid | 3.75 | 3.4 | Fair to Good Tea-like | Not tested | Fair to Good Tea-like | Not tested |

These results demonstrate that in every case the ion exchange resin treatment effectively removes the cocaine and ecgonine without adversely affecting the flavor of the raw extract. The results further demonstrate that the more preferred alcohol/water solvents and pH within the preferred ranges provide particularly good flavor extracts for applications where a cola-like flavor is desired.

As will be appreciated, numerous variations and combinations of the features described above may be utilized without departing from the present invention as defined by the claims. Thus, the raw extract treated in the ion exchange resin contacting step of the process may be prepared from coca leaf ingredients recovered in various ways. It is possible, for example, to extract the ground coca leaves with one solvent to thereby recover a mixture of flavor ingredients and alkaloids, dry these ingredients and then subsequently prepare a raw extract for contact with the ion exchange resins by reconstitution in another solvent. As these and other variations and combinations of the features described above can be utilized without department from the present invention as defined by the claims, the foregoing description of the preferred embodiments should be taken by way of illustration rather than by way of limitation of the invention.

We claim:
1. A method of making a coca flavor extract comprising the steps of:
  (a) forming a raw extract of coca leaves incorporating flavors from said leaves together with one or more alkaloids selected from the group consisting of cocaine and ecgonine in a solvent;
  (b) contacting said raw extract with a cation exchange resin so that said exchange resin takes up said one or more alkaloids in said raw extract to transform said raw extract into a flavor extract substantially devoid of said one or more alkaloids; and (c) physically separating said flavor extract substantially devoid of said one or more alkaloids from the resin.

2. A method as claimed in claim 1 wherein said solvent is selected from the group consisting of water, edible lower alcohols and combinations thereof.

3. A method as claimed in claim 2 wherein said solvent includes water and ethanol.

4. A method as claimed in claim 3 wherein said solvent includes about 20% to about 50% ethanol and about 50% to about 80% water.

5. A method as claimed in claim 2 wherein said solvent includes water and the pH of said raw extract is less than about 8.

6. A method as claimed in claim 5 wherein said pH of said raw extract is between about 5 and about 7.

7. A method as claimed in claim 6 wherein said pH of said raw extract is about 5.5 to about 7.0.

8. A method as claimed in claim 2 wherein said cation exchange resin incorporates sulphonic acid moieties.

9. A method as claimed in claim 8 wherein said cation exchange resin incorporates exchangable H+ ions bound to said sulfonic acid moieties.

10. A method as claimed in claim 2 wherein said step of contacting said raw extract with said resin is conducted at a temperature between about 15° C. and about 50° C.

11. A method as claimed in claim 2 wherein said step of forming an extract includes the step of contacting said solvent with coca leaves so as to extract said flavors and said one or more alkaloids from said leaves.

12. A method as claimed in claim 11 wherein said step of contacting said coca leaves with said solvent includes the step of contacting said coca leaves with said solvent at a leaf:solvent ratio of about 0.045 to about 0.4 w/v.

13. A method as claimed in claim 12 wherein said leaf/solvent ratio is about 0.133 w/v.

14. A method as claimed in claim 11 wherein said step of contacting said leaves with said solvent is performed at between about 15° C. and about 50° C.

15. A method as claimed in claim 11 wherein said step of contacting said solvent with said leaves includes the step of maintaining the leaves and solvent in contact for a period of about four hours to about twenty-four hours.

16. A method as claimed in claim 2 wherein said raw extract includes about 1% to about 5% solids.

17. A method as claimed in claim 16 wherein said raw extract includes about 2% to about 3.5% solids.

18. A method as claimed in claim 2 wherein said step of contacting said extract with said cation exchange resin includes the step of contacting said extract with said resin at an extract:resin ratio of about 1:0.5 to about 1:2.5 by volume.

19. A method as claimed in claim 2 wherein said step of contacting said extract with said resin includes the step of passing said extract through a column of said resin.

20. A method as claimed in claim 1 further comprising the step of removing at least a portion of the solvent from said flavor extract to thereby increase the concentration of said flavors in said flavor extract.

21. A method as claimed in claim 20 wherein said step of removing said solvent is performed so as to remove substantially all of said solvent from said flavor extract.

22. A method of making an edible product comprising the steps of making a flavor extract by a method as claimed in claim 2 or claim 21 and blending said flavor extract with additional edible components compatible with coca leaf flavors.

23. A method as claimed in claim 22 wherein said additional edible components consist essentially of a cola beverage base.

* * * * *